(12) United States Patent
Rink

(10) Patent No.: US 6,332,528 B1
(45) Date of Patent: Dec. 25, 2001

(54) TRANSPORT DEVICE IN A PACKAGING MACHINE

(75) Inventor: Willi Rink, Karlsruhe (DE)

(73) Assignee: IWK Verpackungstechnik GmbH, Stutensee (DE)

( * ) Notice: Subject to any disclaimer, the term of this patent is extended or adjusted under 35 U.S.C. 154(b) by 0 days.

(21) Appl. No.: 09/353,620

(22) Filed: Jul. 15, 1999

(30) Foreign Application Priority Data

Aug. 28, 1998 (DE) .............................................. 198 39 391

(51) Int. Cl.[7] .................................................... B65G 47/26
(52) U.S. Cl. .............................................................. 198/458
(58) Field of Search ................................... 198/570, 458, 198/418, 418.1

(56) References Cited

U.S. PATENT DOCUMENTS

| | | | |
|---|---|---|---|
| 2,745,538 | * 5/1956 | Lamb | 198/458 |
| 2,781,886 | * 2/1957 | Stelzer | 198/458 |
| 2,801,727 | * 8/1957 | Malnati | 198/458 |
| 3,379,299 | * 4/1968 | Griner | 198/458 |
| 3,860,232 | 1/1975 | Martin . | |

FOREIGN PATENT DOCUMENTS

| | | |
|---|---|---|
| 35 05 596 | 8/1985 | (DE) . |
| 196 54 857 | 6/1997 | (DE) . |
| 0 287 845 | 10/1988 | (EP) . |
| 0 672 594 | 9/1995 | (EP) . |

* cited by examiner

Primary Examiner—James R. Bidwell
(74) Attorney, Agent, or Firm—Paul Vincent

(57) ABSTRACT

A plurality of packages and/or products disposed next to each other transverse to the transport direction can be transported together by a transport device in a packaging machine. A guiding device facilitates a change in the mutual sideward separations of the packages and/or products transverse to the transport direction. In order to prevent a retardation of the products in the guiding device, the guiding device has a plurality of conveyor belts disposed next to each other and extending in the transport direction, each for the acceptance of one package and/or one product which are slanted with respect to each other in such a manner that their mutual separation transverse to the transport direction increases in the transport direction. The conveyor belts are substantially of equal lengths and are driven by a common drive device.

4 Claims, 2 Drawing Sheets

TRANSPORT DEVICE IN A PACKAGING MACHINE

This application claims Paris Convention priority of DE 198 39 391.1 filed Aug. 28, 1998 the complete disclosure of which is hereby incorporated by reference.

BACKGROUND OF THE INVENTION

The invention concerns a transport device in a packaging machine for transporting a plurality of packages and/or products together which are disposed next to each other transverse to the transport direction, wherein a guiding device is provided for changing the mutual separation of the packages and/or products transverse to the transport direction.

In filling and packaging machines, the products and/or the packages pass through various processing stations and are transported between same by means of transport devices e.g. in the form of conveyor belts. In the event that a plurality of products and/or packages are to be transported together i.e. in a group aligned next to each other, the products frequently fail to have the desired sideward separation. When, for example, three tubes are to simultaneously filled and then further transported to the packaging unit, they gain entrance to the conveyor belt with a mutual sideward separation of approximately 50 mm. Since however a larger mutual sideward separation of approximately 75 mm is desired for transfer to the downstream processing station, they must be displaced sidewardly relative to each other during transport.

Towards this end, conventional installations utilize guiding fins disposed in a stationary fashion above the conveyor belt which direct the sidewardly disposed tubes in an outward direction to increase the mutual separation between the tubes transverse to the transport direction. It has however turned out that the sideward tubes are slowed substantially during the deflecting motion by the guiding walls along which they slide so that they trail the central unretarded tube by a significant amount. Since however the tubes must be simultaneously introduced at the end of the conveyor belt into the subsequent processing station, the leading middle tube must wait at the end of the conveyor belt for the trailing sideward tubes. This increases the processing time. Moreover, a special device must be provided for accepting the sequentially arriving tubes and to simultaneously feed same into the processing station (in particular, a cartoning station), as a result of which the structural complexity is increased.

It is the underlying purpose of the invention to create a transport device in a packaging machine of the above mentioned kind with which the mutual sideward separation between the products and/or packages can be changed without having them precede or trail each other.

SUMMARY OF THE INVENTION

This purpose is achieved in accordance with the invention with a transport machine in that the guiding device comprises a plurality of conveyor belts travelling next to each other in the transport direction, each for the acceptance of one package and/or a product, which are disposed at an angle with respect to each other in such a fashion that their mutual separation transverse to the transport direction changes in the transport direction, with the conveyor belts being substantially of equal length and capable of being driven by a common drive device.

In accordance with the invention, the mutual separation between individual tubes or products of a group is not increased or changed by sideward displacement forces on the conveyor belt. Rather, the device comprises, at least in sections, a plurality of conveyor belts corresponding to the number of products or tubes, which travel diagonally at a slight angle with respect to each other. When a tube is dispensed at the input side of each conveyor belt, the mutual sideward separation of the tubes changes as they travel along these individual conveyor belts. At the end of the conveyor belts, the tubes can either be directly passed to the downstream processing station or an additional single common conveyor belt is provided for all tubes.

The slight diagonal disposition of the conveyor belts relative to each other leads to a slight difference in the transport path length traveled by the individual tubes. In order to guarantee that the tubes arrive simultaneously at the end of the conveyor belt, a controller can be provided for driving the belts with differing speeds to thereby compensate for deviations. These deviations are, however, generally so small that compensation can be taken when dispensing the tubes on the conveyor belts or when removing them therefrom. This facilitates, in a preferred embodiment of the invention, that the conveyor belts are substantially of equal length and are driven by a common drive device to minimize the structural difficulty and expense and moreover to guarantee that the conveyor belts move with equal speeds.

The conveyor belts are conventionally guided, at least in their end regions, by means of rollers. A preferred embodiment of the invention provides that the conveyor belts have a common drive shaft on which a plurality of rollers are borne. Each roller guides and thereby drives one conveyor belt. In many cases, three conveyor belts are disposed next to each other, wherein the central conveyor belt travels straight in the transport direction and the two outer conveyor belts are each slightly slanted towards the outside. The invention however is applicable for all transporting devices having at least two conveyor belts. Since the axes of rotation of the individual conveyor belt rollers on the ends do not coincide with each other, means must be provided for equal driving of all conveyor belts using a common drive shaft. This is achieved in accordance with the invention in that one of the rollers, preferentially a middle roller i.e. the roller associated with the middle straight conveyor belt, is mounted for mutual rotation with the drive shaft, wherein the drive shaft extends substantially at right angles to the longitudinal path of the conveyor belt and thereby to the transport direction. The sideward rollers, each guiding one of the diagonally extending conveyor belts, do not receive their rotational motion directly from the drive shaft, rather are indirectly connected thereto for rotational drive. Towards this end, the sideward rollers are borne for free rotation on the drive shaft and can freely exercise a reciprocal motion thereon, i.e. a pivot motion about a pivot axis extending perpendicular to the drive shaft. A rotational motion of the sideward rollers which is synchronized with the rotational motion of the drive shaft and thereby of the middle roller, is effected by connecting each sideward roller to the middle roller using a transfer element. The transfer element is thereby configured to secure rotational coupling between the middle roller and each side roller while nevertheless allowing the reciprocal motion of the sideward rollers relative to the middle roller and thereby relative to the drive shaft. In a particularly simple embodiment, the transfer element is a helical spring surrounding the drive shaft. The rotational motion of the middle roller is transformed by the rotation of the helical spring about its longitudinal axis substantially without elastic deformation, whereas the reciprocal motion of the side rollers is facilitated by the elasticity of the helical spring in its longitudinal direction. Alternatively, a bellows can also be utilized as a transfer element.

Further details and features of the invention can be extracted from the following description of an embodiment with reference to the accompanying drawing.

DESCRIPTION OF THE PREFERRED EMBODIMENT

Figure 1:
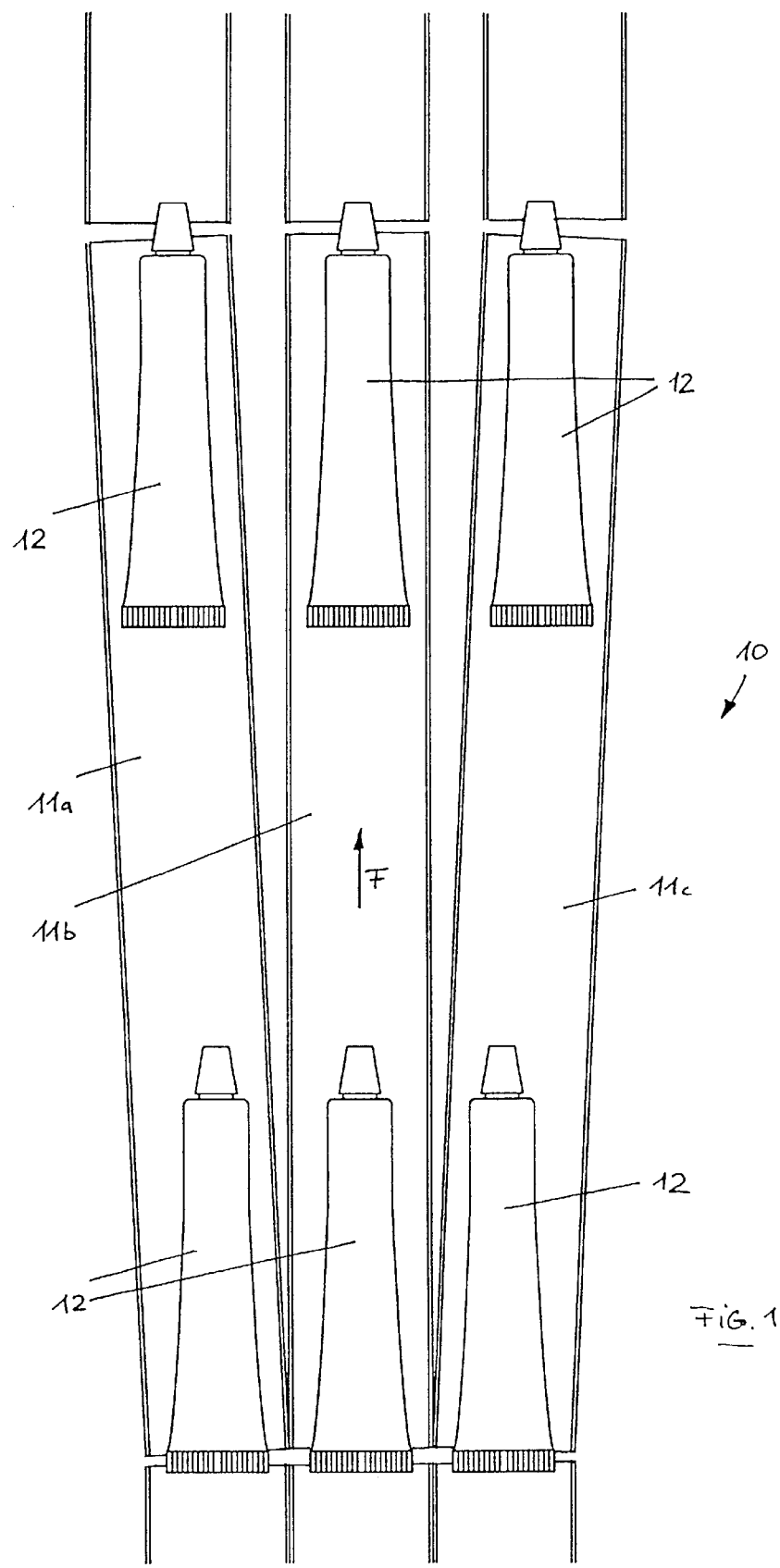
FIG. 1 shows a schematic plan view of a guiding device.

FIG. 1 schematically shows how the mutual sideward separation between three tubes 12, which be long to a common processing group, is changed along the transport path. The three tubes 12 are introduced on the input side, i.e. in accordance with FIG. 1 at the lower end, of a guiding device 10 and each is disposed on its own conveyor belt 11a, 11b and 11c respectively. As shown in FIG. 1, the middle conveyor belt 11b has straight travel in the transport direction F, whereas the two outer conveyor belts 11a and 11c extend diagonally in an outward direction by a small amount relative to the middle conveyor belt 11b. As a result thereof, the conveyor belts 11a, 11b, 11c and thereby the tubes 12 located thereon, have an increased mutual separation transverse to the transport direction F at the dispensing side (in accordance with FIG. 1 the upper end) of the guiding device 10. The tubes are then either directly transferred from the conveyor belts 11a, 11b and 11c to the processing station or are passed on to a downstream conveyor belt.

Figure 2:
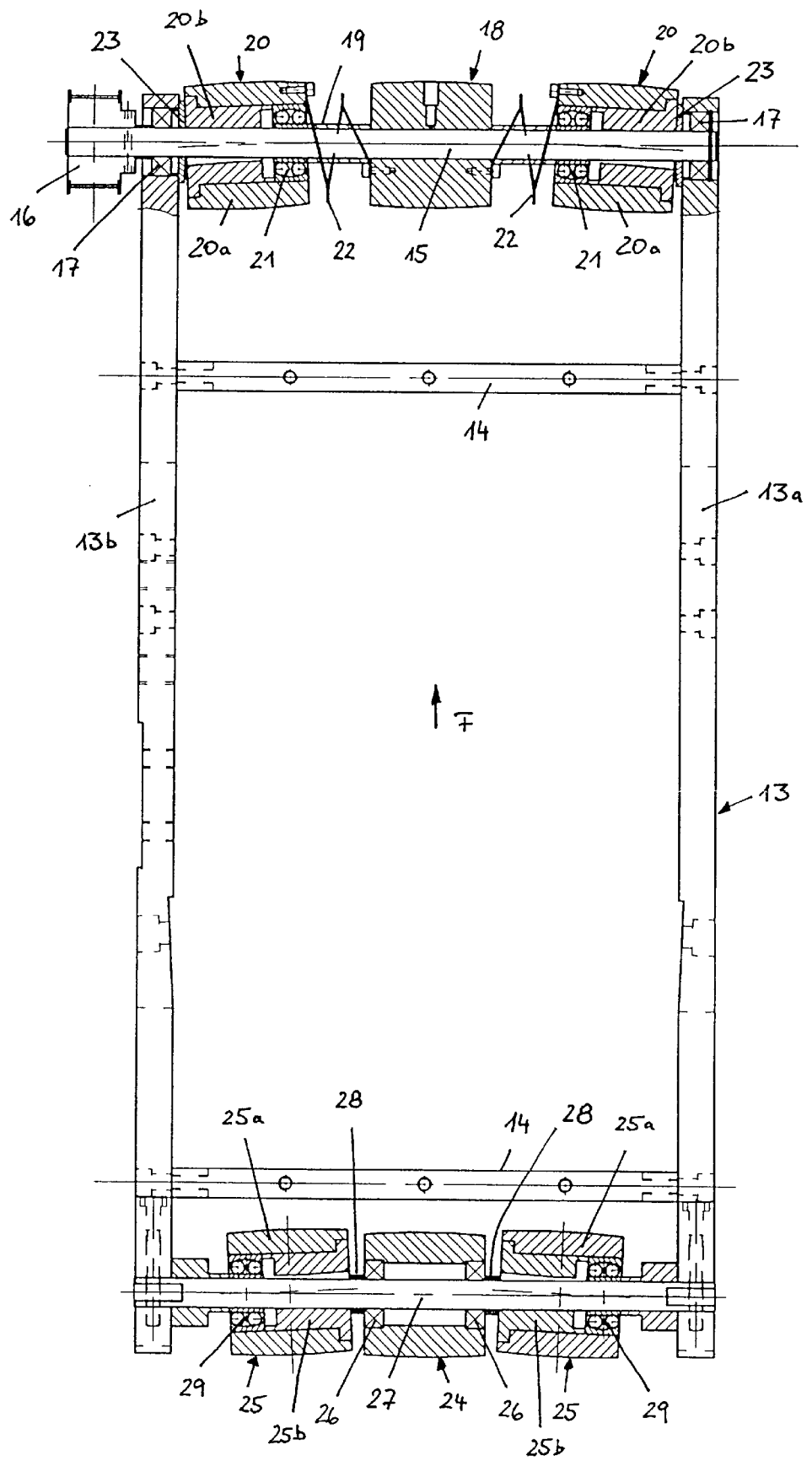
FIG. 2 shows a horizontal section through the drive device of the guiding device.

The bearing and drive structure of the conveyor belts 11a, 11b and 11c is shown in FIG. 2. A flat frame 13 comprises two sidewardly separated longitudinal supports 13a, 13b extending in the transport direction F which are connected via two separated transverse supports 14 to form the frame. A transverse drive shaft 15, borne for rotation via a bearing 17, is disposed at the upper end of the longitudinal supports 13a, 13b and protrudes outwardly beyond one of the longitudinal supports 13b to support a sprocketed wheel or a pulley 16 by means of which the shaft 15 can be set into rotation by a chain or a belt in a manner not shown. A roller 18 is securely mounted to the central region of the drive shaft 16 for mutual rotation therewith. The roller 18 serves for acceptance of the middle, straight conveyor belt 11b.

A roller 20 is borne on the drive shaft 15 for each of the side conveyor belts 11a and 11c. The roller 20 is disposed on the drive shaft 15 with a certain degree of play and can thereby freely rotate relative thereto. Moreover, a curved ball bearing 21 allows the roller 20 to exercise a reciprocal or pivoting motion relative to the drive shaft 15 about a pivot axis extending perpendicular thereto. The roller 20 comprises essentially a substantially cylindrical metallic base member 20a supporting the curved ball bearing 21. A tubular or cylindrically shaped plastic bushing 20b is inserted into the base member 20a along a portion of its length having an inner bore hole which tapers outwardly slightly to bear the roller 20 for reciprocal motion on the drive shaft 15. The plastic bushing 20b defines the diagonal position of the roller 20 on the drive shaft 15 and is mounted on the base member 20a in an exchangeable fashion so that, in the event of bushing 20b wear or in the event that a different diagonal position is desired for the roller 20, a new or a different bushing 20b can be inserted.

A spacer bushing 19 is disposed between the central roller 18 and each of the side rollers 20 and a stop washer 23 is provided between the outer ends of each of the sideward rollers 20 and the associated longitudinal support 13a or 13b respectively and is preferentially made from a material having a low coefficient of friction.

The middle roller 18 is connected to each of the sideward rollers 20 by means of a helical spring 22 which surrounds the drive shaft 15 and is firmly attached at its ends to the respective roller. The helical spring 22 effects a connection which is secure with respect to rotation for transfer of the rotational motion while facilitating and compensating for a reciprocal motion of the sideward rollers 20 via its elasticity in the longitudinal direction.

A transverse support rod 27 is disposed on the opposite lower end of the longitudinal supports 13a and 13b upon which a middle roller 24 is borne for rotation via bearing 26. The middle roller 24 is aligned with the middle roller 18 on the drive shaft 15 so that the middle conveyor belt 11b can travel in a straight line via these two rollers.

Each sideward roller 25 is borne for rotation on the support rod 27 via one end ball bearing 29 each with the intermediate insertion of elastic spacer bushings 28 at the sides thereof. The rollers 25 also have the above mentioned structure comprising a cylindrical base member 25a and a cylindrical plastic bushing 25b, wherein the rollers 25 are introduced on the support rod 27 with an amount of play to facilitate exercise of a reciprocal motion about an axis perpendicular to the longitudinal axis of the support rod 27. Each sideward conveyor belt 11a and 11c extends between one of the sideward rollers 25 and the associated upper sideward roller 20 of the drive shaft 15.

When the drive shaft 15 is set into rotation the roller 18, which is firmly connected thereto, rotates as well to move the central conveyor belt 11b and cause the lower middle roller 4 to rotate about the support rod 27.

The rotational motion of the middle roller 11 is transferred to each of the associated sideward rollers 20 by the rotational springs 22, wherein they likewise rotate about the longitudinal axis of the drive shaft 15. The resistive forces arising from the stiffness of the conveyor belts 11a and 11c cause the sideward rollers 20 to maintain their diagonal position 20 relative to the middle roller 18 during rotation, wherein they exercise a continuous adjustment or displacement during rotation via their reciprocal bearing. The same is true for the sideward rollers 25 on the opposite end of the conveyor belt, which are likewise held in their slanted positions relative to the middle roller 24. The above mentioned construction facilitates driving of the middle roller as well as the associated sideward roller using a common drive shaft 15, although the longitudinal axes of the rollers are not parallel to each other.

I claim:

1. A transport device in a packaging machine for transporting a group of objects, the group comprising a plurality of at least one of packages and products disposed next to each other transverse to a transport direction of the device, the transport device comprising:

a frame;

at least a first and a second conveyor belt, said first and said second conveyor belts disposed next to each other and extending in the transport direction, each of said first and said second conveyer belts for transporting one object of the group, said first conveyer belt having a length substantially equal to a length of said second conveyer belt; and support and drive means mounted to said frame, said support and drive means communicating with said first and said second conveyer belts to dispose said first conveyor belt at an angle relative to said second conveyor belt, wherein a separation between said first and said second conveyor belts transverse to the transport direction changes in the transport direction for changing a separation between the objects in the group, wherein said support and drive means comprise a common drive shaft for said first and said second conveyor belt, a first roller supporting said first conveyor belt, and a second roller supporting said second conveyor belt, said common drive shaft bearing said first and said second rollers, and wherein said second roller is borne for secure rotation along with said drive shaft and said first roller is borne for rotation and for reciprocal motion on said drive shaft, said support and drive means comprising a transfer element for transferring a rotational motion of said second roller to said first roller.

2. The transport device of claim 1, wherein said second roller is a middle roller and said first roller is a sideward roller, said transfer element connecting said middle roller to said sideward roller for secure rotation therewith while allowing reciprocal motion of said sideward roller relative to said middle roller.

3. The transport device of claim 1, wherein said transfer element comprises a helical spring surrounding said drive shaft.

4. The transport device of claim 1, wherein said transfer element connects said first roller to said second roller for secure mutual rotation of said first roller along with said second roller while permitting said first roller to pivot relative to said drive shaft about an axis extending perpendicular to said drive shaft.

* * * * *